Sept. 19, 1967 J. BROWN ET AL 3,342,403
MACHINE HAVING A ROTOR SUPPORTED BETWEEN END-PLATES
Filed June 7, 1965 3 Sheets-Sheet 1
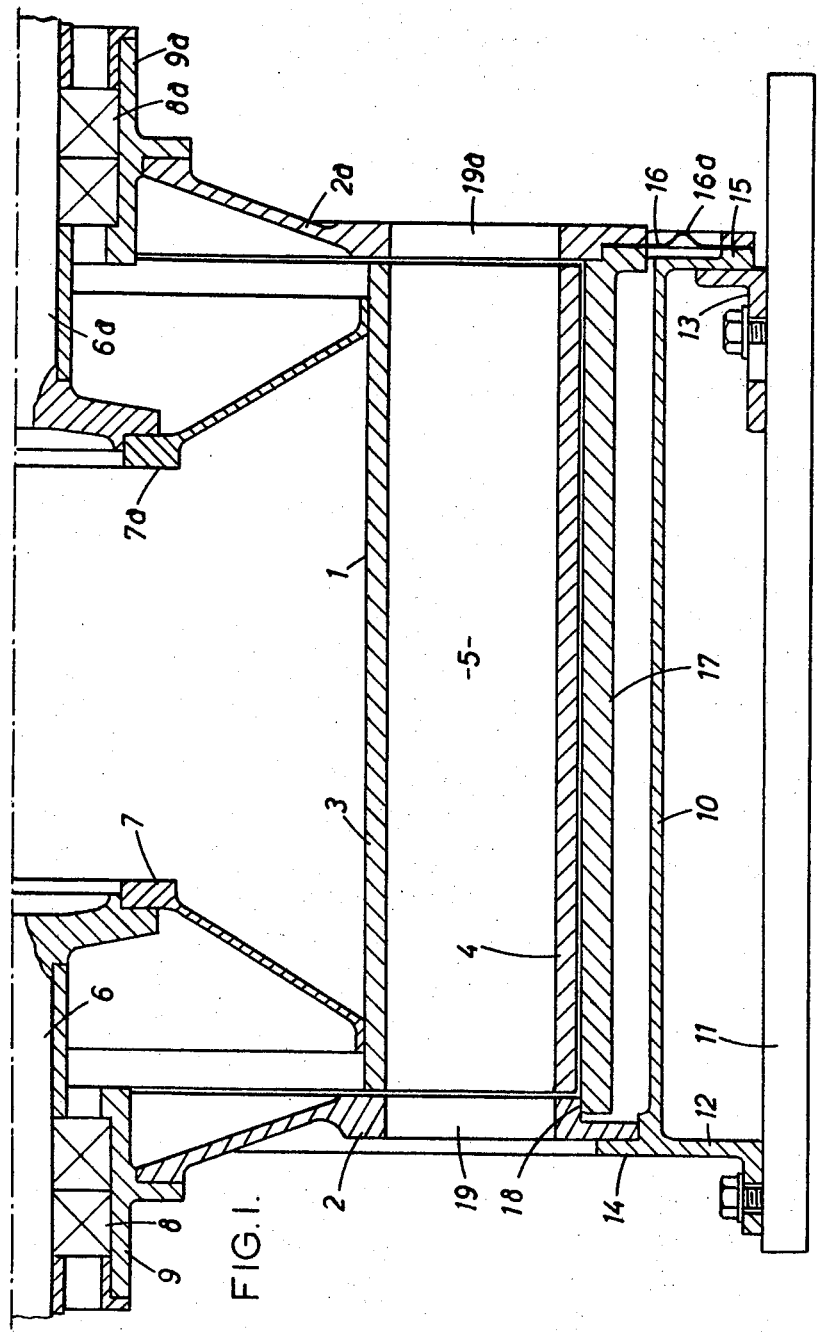

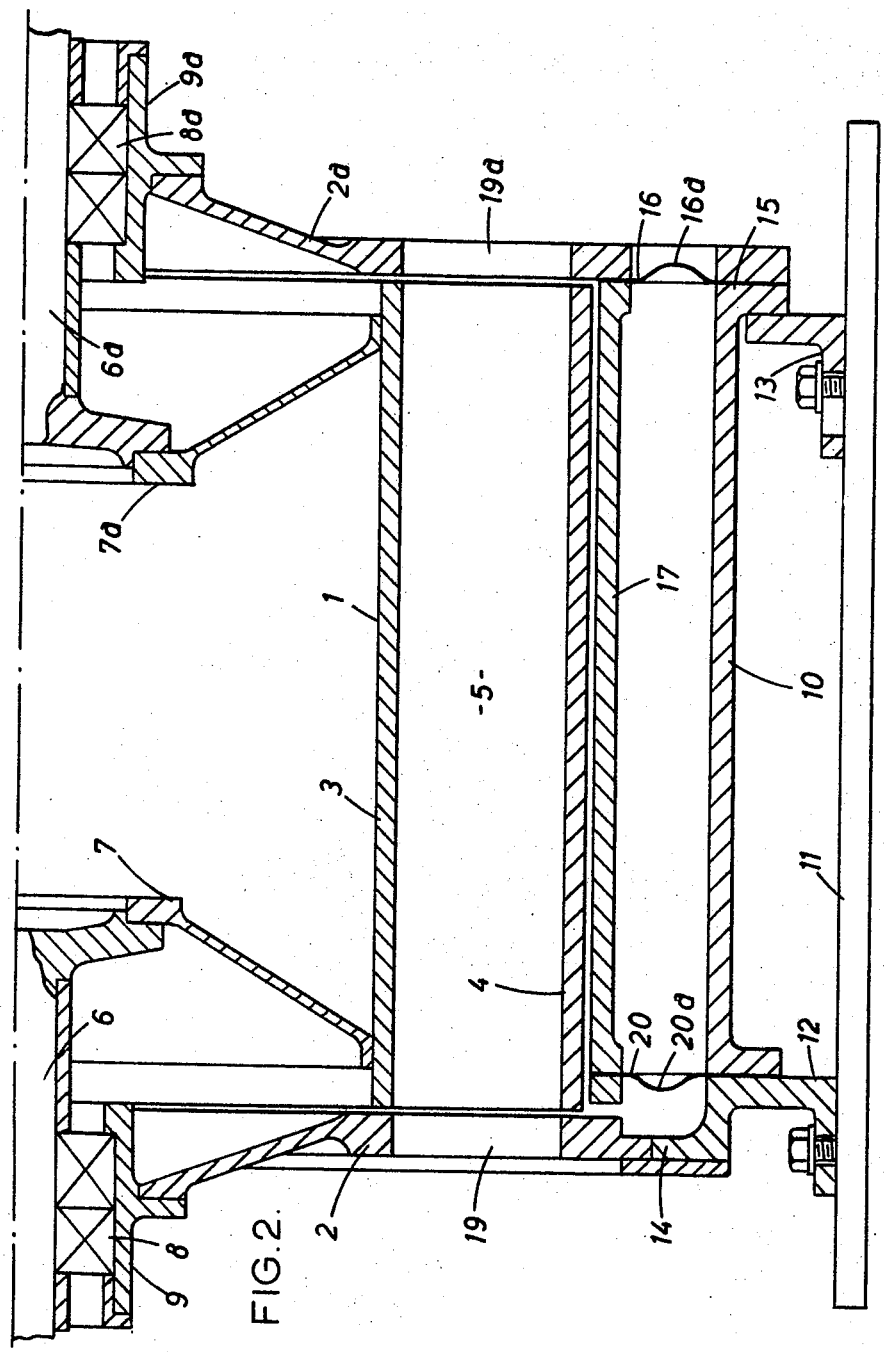

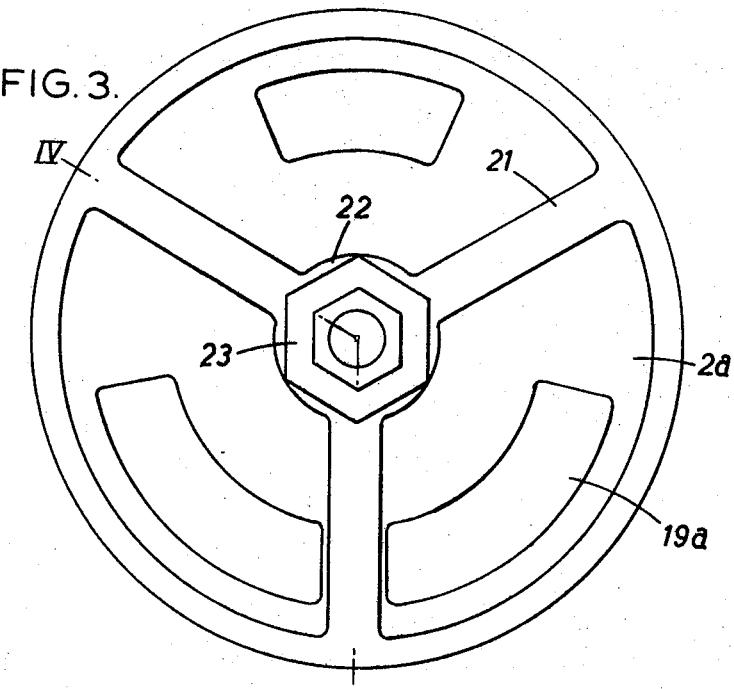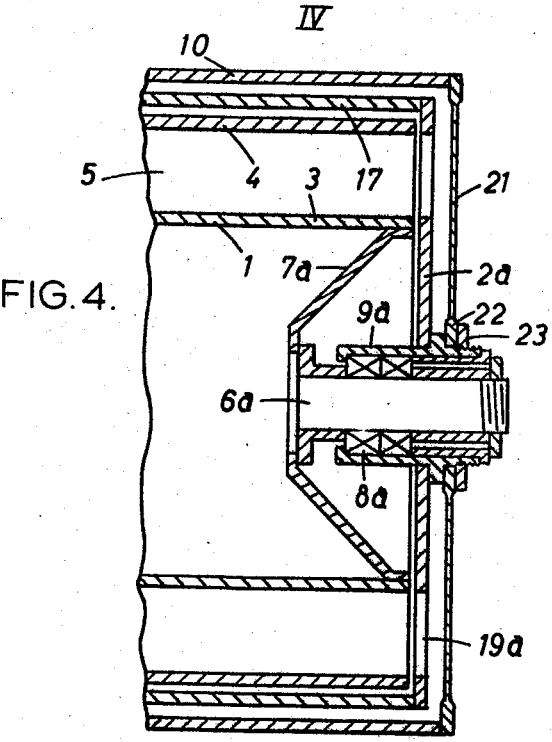

United States Patent Office 3,342,403
Patented Sept. 19, 1967

3,342,403
MACHINE HAVING A ROTOR SUPPORTED
BETWEEN END-PLATES
James Brown, Fleet, and Alan George Andrews, Farnham, England, assignors to Power Jets (Research & Development) Limited, London, England, a British company
Filed June 7, 1965, Ser. No. 461,676
Claims priority, application Great Britain, June 22, 1964, 25,751/64
15 Claims. (Cl. 230—69)

ABSTRACT OF THE DISCLOSURE

A pressure exchanger having a casing including two end plates and a rotor, each end-plate being constrained to follow axial movement of the adjacent end of the rotor relative to the other end-plate, the spacing between each end of the rotor and its adjacent end-plate being maintained subsantially consant by is supporting means, including a corrugated annulus or equi-angular placed strips locating one of the end plates with respect to another part of the casing, the supporting means acting to prevent the end plates tilting in relation to each other.

---

This invention relates to a machine having a rotor supported between end-plates.

In some machines, such as pressure exchangers and rotary regenerative heat exchangers, an end-plate is required to be maintained in closely spaced relation to a rotor despite variations in dimension suffered by the rotor along the rotational axis.

A pressure exchanger is herein defined as an apparatus comprising cells in which one gas quantity expands, so compressing another gas quantity with which it is in direct contact, ducting to lead gas at different pressures steadily to and from the cells and means to effect relative motion between the cells and the ducting.

A pressure exchanger includes a rotor having a plurality of axially extending cells supported for rotation about its axis between two end-plates. The cells are open at their axial ends and communicate with ducting through a port or ports formed in each end-plate to permit gases at different pressures to flow between the cells and ducting. A running clearance is maintained between each end-plate and the adjacent end of the rotor but this clearance is made as small as possible to keep the leakage of gases between cells to a minimum. A casing extends between the end-plates.

Since during operation of the pressure exchanger the gases flowing into and out of the cells may be at a high temperature, different parts of the pressure exchanger may assume different temperatures. It is therefore necessary to allow for change in the axial dimension of the rotor while maintaining the clearance between each rotor end and its adjacent end-plate substantially constant and the end-plates co-axial.

According to an aspect of the present invention a machine has a casing including two non-rotary members, a member mounted for rotation between the non-rotary members with freedom for axial expansion, each non-rotary member being constrained to follow axial movement of the adjacent end of the rotary member relative to the other non-rotary member whereby the spacing between each end of the rotary member and its adjacent non-rotary member is maintained substantially constant and supporting means including a deformable element which locates one of the non-rotary members with respect to another part of the casing, the supporting means permitting axial movement of the non-rotary member and the adjacent end of the rotary member in relation to the other non-rotary member while acting to prevent the non-rotary members from tilting in relation to each other.

According to another aspect of the present invention a pressure exchanger has a casing including two end-plates a cell ring mounted for rotation between the end-plates with freedom for axial expansion, each end-plate being constrained to follow axial movement of the adjacent end of the cell ring relative to the other end-plate whereby the spacing between each end of the cell ring and its adjacent end-plate is maintained substantially constant and supporting means including a deformable element which locates one of the end-plates with respect to another part of the casing, the supporting means permitting axial movement of the end-plate and the adjacent end of the cell ring in relation to the other end-plate while acting to prevent the end-plates from tilting in relation to each other.

Some embodiments of the invention will now be described by way of example, reference being made to the accompanying diagrammatic drawings in which:

FIGURE 1 shows one half of an axial section through a pressure exchanger according to the invention;

FIGURE 2 shows one half of an axial section through another pressure exchanger according to the invention;

FIGURE 3 shows in end elevation a further pressure exchanger according to the invention; and FIGURE 4 shows a part of a section taken on the line IV—IV of FIGURE 3.

The pressure exchanger shown in FIGURE 1 comprises a cell ring 1 mounted for rotation between a pair of generally disc-shaped end-plates 2, 2a. The cell ring 1 is formed of two concentric cylinders 3, 4 spaced apart by radially extending walls 5 which divide the annular space between the cylinders 3, 4 into a plurality of axially extending cells. Stub-shafts 6, 6a are secured to the cell ring 1 by hub members 7, 7a. The stub-shafts 6, 6a are received in bearings 8, 8a contained in housings 9, 9a attached to the end-plates 2, 2a. Each end-plate 2, 2a is constrained, by means of its associated bearing 8, 8a to follow any axial movement of the adjacent end of the cell ring 1 relative to the other end-plate, thus the clearance between an end-plate and its adjacent end of the cell ring is maintained substantially constant under all conditions.

A tubular member 1 is secured to a base plate 11 by means of supports 12, 13, the support 13 being of a type permitting axial movement of the member 10 relative to the base plate 11. The end-plate 2 is rigidly secured to an inwardly extending flange 14 of the member 10 and the end-plate 2a is secured to an outwardly extending flange 15 of the member 10 by means of a deformable element 16. The member 10 and the end-plates 2, 2a thus form a casing around the cell ring 1. The element 16 is a sheet metal annulus having a single annular corrugation 16a and holds the end-plate 2a co-axial of the member 10, and thus of the end-plate 2, while permitting relative axial movement between the end-plates 2, 2a. A cylindrical extension 17 rigidly secured at one end to the end-plate 2a is at the other end a sliding fit over a step 18 formed in the end-plate 2. The extension 17 co-operates with the deformable element 16 to prevent the end-plates 2, 2a tilting in relation to each other.

Each end-plate has one or more ports 19, 19a (only one in each end-plate being shown) through which working gas can flow into and out of the cells of the cell ring.

In operation, gases at different temperatures flow to and from the pressure exchanger so that the cell ring 1 and the member 10 may assume different temperatures and in consequence alter in axial length to different extents. The end-plate 2 cannot move axially since it is secured to the left-hand end (as viewed in the drawing) of the member 10 which is, in turn, secured to the base plate 11. Any effects of expansion or contraction of the pressure exchanger parts will, therefore, be apparent at the right-hand end of the pressure exchanger. Assuming that expansion of the parts has occurred and that the cell ring 1 has expanded more than the member 10, the right-hand end of the member 10 will take up a new position since the support 13 permits the casing to expand axially to the right. The right-hand end of the cell ring 1 will also take up a new position moving the end-plate 2a with it since they are constrained to move axially together. The movement of the end-plate 2a relative to the adjacent end of the member 10 is allowed by the flexing of the deformable element 16 and by the sliding of the end-plate extension 17 on the step 18 of the end plate 2. The clearances between the ends of the cell ring 1 and the adjacent end-plates are thus maintained at their original settings while the deformable element 16 in association with the sliding of the extension 17 on the step 18 prevent the end-plate 2a tilting relative to the end-plate 2 so that the end-plates remain co-axial.

In addition, since the deformable element 16 can flex at the corrugation 16a any relative changes in diameter between the end-plate 2a and the member 10 can be accommodated.

In a modification (not illustrated) the step 18 on the end-plate 2 is omitted and a peripheral rib is provided on the extension 17 of the end-plate 2a to be in sliding contact with the inner surface of the member 10.

The embodiment of the invention shown in FIGURE 2 is generally similar to that shown in FIGURE 1 and the same reference numerals have been used to indicate like parts. This embodiment differs in that the end of the extension 17 remote from the end-plate 2a is supported co-axially of the member 10 and the end-plate 2 by another deformable element 20. The element 20 is similar to the element 16 and has a single annular corrugation 20a.

The operation of this embodiment is similar to that previously described except that axial movement of the end-plate 2a relative to the end-plate 2 is permitted by flexing of the elements 16 and 20, which elements maintain the end-plates 2, 2a co-axial at all times.

It will be seen that the element 20, because it can flex at the corrugation 20a, permits the extension 17 to expand or contract freely in the radial direction relative to the member 10 and the end-plate 2 without reducing its effectiveness in maintaining the end-plates 2, 2a co-axial.

The embodiment of FIGURES 3 and 4 is generally similar to those described with reference to FIGURES 1 and 2 and only the right-hand end of the pressure exchanger has been shown, the same reference numerals again being used to indicate like parts.

In this embodiment the right-hand end of the member 10 extends axially beyond the end-plate 2a. The end-plate 2a is mounted co-axially of the member 10, and thus of the end-plate 2, by means of a deformable element 21 formed of three equi-angularly spaced flexible metal strips secured at their radially outer ends to the member 10 and at their radially inner ends to a ring 22 which fits snugly around the bearing housing 9a. The ring 22 is locked to the end-plate 2a by a nut 23 screwed on to a screw-threaded portion of the housing 9a.

The end of the extension 17 remote from the end-plate 2a is preferably held co-axial of the end-plate 2 by a deformable element such as the element 20 but if desired the end of the extension 17 may be made a sliding fit on the end-plate 2 or in the member 10.

In operation this embodiment is similar to those previously described, flexing of the strips of the element 21 permitting the end-plate 2a to move axially relative to the end-plate 2 while acting to prevent the end-plates from tilting in relation to each other.

This embodiment has the advantage that by slackening the nut 23 the end-plate 2a can be turned about its axis, thereby permitting the position of the ports 19a to be changed relative to the ports 19 in the end-plate 2, and locked at a new location by re-tightening the nut 23.

It will be appreciated that the deformable elements 16 and 20 may be in the form of three equi-angularly spaced strips similar to the deformable element 21.

We claim:

1. A machine including a casing, two non-rotary members forming part of the casting, a member mounted for rotation between the non-rotary members with freedom for axial expansion, each non-rotary member being constrained to follow axial movement of the adjacent end of the rotary member relative to the other non-rotary member whereby the spacing between each end of the rotary member and its adjacent non-rotary member is maintained substantially constant and supporting means including a deformable element which is fixedly attached to one of the non-rotary members and to another part of the casing and which locates said non-rotary member with respect to the other part of the casing, the supporting means permitting axial movement of the non-rotary member and the adjacent end of the rotary member in relation to the other non-rotary member while acting to prevent the non-rotary members from tilting in relation to each other.

2. A machine according to claim 1, wherein the supporting means further includes an axial extension of said one non-rotary member, the extension having a surface in sliding engagement with said other part of the casing.

3. A machine according to claim 1, wherein the supporting means further includes an axial extension of said one non-rotary member, the extension having a surface in sliding engagement with said other non-rotary member.

4. A machine according to claim 1, wherein the supporting means further includes an axial extension of said one non-rotary member and another deformable element which locates the extension with respect to said other part of the casing.

5. A machine according to claim 4, wherein both the deformable element and the other deformable element are annular and have an annular corrugation.

6. A pressure exchanger including a casing, two end-plates forming part of the casing, a cell ring mounted for rotation between the end-plates with freedom for axial expansion, each end-plate being constrained to follow axial movement of the adjacent end of the cell ring relative to the other end-plate whereby the spacing between each end of the cell ring and its adjacent end-plate is maintained substantially constant and supporting means including a deformable element which is fixedly attached to one of the end-plates and to another part of the casing and which locates that end-plate with respect to that other part of the casing supporting means permitting axial movement of the end-plate and the adjacent end of the cell ring in relation to the other end-plate while acting to prevent the end-plates from tilting in relation to each other.

7. A pressure exchanger according to claim 6, wherein said other end-plate and said other part of the casing are secured rigidly together.

8. A pressure exchanger according to claim 7, further including an axial extension of said one end-plate, which extension extends within said other part of the casing.

9. A pressure exchanger according to claim 8, wherein the axial extension has a surface which is in sliding engagement with said other part of the casing.

10. A pressure exchanger according to claim 8, wherein the axial extension has a surface which is in sliding engagement with said other end-plate.

11. A pressure exchanger according to claim 8, wherein the supporting means includes another deformable element extending between the axial extension and said other part of the casing.

12. A pressure exchanger according to claim 11, wherein both the deformable element and the other deformable element are in the form of an annulus having an annular corrugation.

13. A pressure exchanger according to claim 6, wherein the deformable element comprises an annulus having an an annular corrugation.

14. A machine including a casing, two non-rotary members forming part of the casing, a member mounted for rotation between the non-rotary members with freedom for axial expansion, each non-rotary member being constrained to follow axial movement of the adjacent end of the rotary member relative to the other non-rotary member whereby the spacing between each edge of the rotary member and its adjacent non-rotary member is maintained substantially constant and supporting means including a deformable element which locates one of the non-rotary members with respect to another part of the casing, the supporting means permitting axial movement of a non-rotary member and the adjacent end of the rotary member in relation to the non-rotary member while acting to prevent the non-rotary members from tilting in relation to each other, said deformable element comprising three equi-angularly spaced strips each secured at one end to said one non-rotary member and at the other end to said other part of the casing.

15. A pressure exchanger including a casing, two end-plates forming part of the casing, a cell ring mounted for rotation between the end-plates with freedom for axial expansion, each end plate being constrained to follow axial movement of the adjacent end of the cell ring relative to the other end-plate whereby the spacing between each end of the cell ring and its adjacent end-plate is maintained substantially constant and supporting means including a deformable element which locates one of the end-plates with respect to another part of the casing, the supporting means permitting axial movement of the end-plate and the adjacent end of the cell ring in relation to the other end-plate while acting to prevent the end-plates from tilting in relation to each other, said supporting means including another deformable element extending between the axial extension and said other part of the casing, the deformable element and the other deformable element each comprising three equi-angularly spaced strips secured at their inner ends to said one end-plate and at their outer ends to said other part of the casing.

References Cited
UNITED STATES PATENTS

| | | | |
|---|---|---|---|
| 2,348,833 | 5/1944 | Miller | 60—39.32 |
| 2,510,645 | 6/1950 | McMahan | 60—39.32 |
| 2,591,399 | 4/1952 | Buckland | 60—39.32 |
| 2,766,928 | 10/1956 | Jendrassik | 60—39.45 |
| 2,779,530 | 1/1957 | Jendrassik | 60—39.45 |
| 3,027,715 | 4/1962 | Morris | 69—39.32 |
| 3,055,577 | 9/1962 | Vickery | 230—69 |
| 3,164,318 | 1/1965 | Barnes | 60—39.45 |

DONLEY J. STOCKING, *Primary Examiner.*

W. J. KRAUSS, *Assistant Examiner.*